United States Patent
Kobayashi et al.

(10) Patent No.: US 8,926,770 B2
(45) Date of Patent: Jan. 6, 2015

(54) METHOD OF HOT STAMPING GALVANIZED STEEL SHEET

(75) Inventors: Yoshifumi Kobayashi, Tokyo (JP); Yasunori Ito, Tokyo (JP); Kazuyuki Kawano, Tokyo (JP); Takashi Yaekura, Tokyo (JP)

(73) Assignee: Nippon Steel & Sumitomo Metal Corporation, Tokyo (JP)

( * ) Notice: Subject to any disclaimer, the term of this patent is extended or adjusted under 35 U.S.C. 154(b) by 0 days.

(21) Appl. No.: 13/812,408

(22) PCT Filed: Aug. 23, 2011

(86) PCT No.: PCT/JP2011/068911
§ 371 (c)(1),
(2), (4) Date: Jan. 25, 2013

(87) PCT Pub. No.: WO2012/026442
PCT Pub. Date: Mar. 1, 2012

(65) Prior Publication Data
US 2013/0118646 A1    May 16, 2013

(30) Foreign Application Priority Data
Aug. 23, 2010 (JP) ................. 2010-185801

(51) Int. Cl.
*C21D 8/02* (2006.01)
*G01N 25/00* (2006.01)
*C23C 2/28* (2006.01)
*C25D 5/50* (2006.01)
*G01J 5/00* (2006.01)
*C23C 2/06* (2006.01)
*B21D 22/02* (2006.01)
*G01J 5/12* (2006.01)

(52) U.S. Cl.
CPC ............... *C21D 8/0205* (2013.01); *C23C 2/28* (2013.01); *C25D 5/50* (2013.01); *G01J 5/0003* (2013.01); *C23C 2/06* (2013.01); *B21D 22/022* (2013.01); *G01J 5/12* (2013.01)
USPC ........................................... 148/508; 148/511

(58) Field of Classification Search
USPC ....................................................... 148/511
See application file for complete search history.

(56) References Cited

U.S. PATENT DOCUMENTS 5,481,112 A  *  1/1996  Marui et al. ............. 250/339.14

FOREIGN PATENT DOCUMENTS

| JP | 7-11413 A | 1/1995 |
| JP | 7-55737 A | 3/1995 |

(Continued)

OTHER PUBLICATIONS

Machine translation of JP 2007-182608, Jul. 2007.*

(Continued)

*Primary Examiner* — Roy King
*Assistant Examiner* — Xiaowei Su
(74) *Attorney, Agent, or Firm* — Birch, Stewart, Kolasch & Birch, LLP

(57) ABSTRACT

In a cooling a galvanized steel sheet (W), change in emissivity of a surface of the galvanized steel sheet (W) is measured in a temperature range lower than the boiling point of zinc but not lower than the ferrite transformation temperature, using an emissivity sensor (4) with an observation wavelength of 1.4 μm or longer, and pressing and quenching in a pressing and quenching apparatus (2) is started after completion of an alloying reaction has been detected based on the change in emissivity. The emissivity sensor (4) preferably has an InGaAs element or a thermopile as a measuring element.

5 Claims, 3 Drawing Sheets

(56) References Cited

FOREIGN PATENT DOCUMENTS

| | | |
|---|---|---|
| JP | 7-150328 A | 6/1995 |
| JP | 11-269627 A | 10/1999 |
| JP | 2007-182608 A | 7/2007 |

OTHER PUBLICATIONS

Machine translation of JP 07-011413, Jan. 1995.* http://en.wikipedia.org/wiki/Thermopile, May 2013.*
http://en.wikipedia.org/wiki/Moving_average, Oct. 2013.*
International Search Report issued in PCT/JP2011/068911, mailed on Nov. 15, 2011.
Written Opinion of the International Searching Authority issued in PCT/JP2011/068911, mailed on Nov. 15, 2011.
Forms PCT/IB/338, PCT/IB/373, and PCT/ISA/237, mailed Mar. 28, 2013, for International Application No. PCT/JP2011/068911.

* cited by examiner

METHOD OF HOT STAMPING GALVANIZED STEEL SHEET

TECHNICAL FIELD

The present invention relates to a method of hot stamping a galvanized steel sheet such as hot-dip galvanized steel sheet and electrogalvanized steel sheet.

BACKGROUND

Hot stamping is one method of forming by which a steel sheet, heated at a temperature not lower than the Ac3 point, is pressed using metal dies, and then quenched by rapidly cooling the steel sheet in the dies. According to the hot stamping, the steel sheet may be improved in the strength, and may be ensured a desired level of geometrical stability. Heating of the steel sheet, at the primary stage of the hot stamping, is often performed by furnace heating, near-infrared heating, far-infrared heating, induction heating, direct energizing heating or the like.

If the material to be hot-stamped is a galvanized steel sheet, the galvanized steel sheet is heated in the heating process to a temperature not lower than the point Ac3, and below the boiling point of zinc, practically at 900° C. or lower. When heated up to this temperature range, plated zinc turns into a molten state, and thereby liquid phase diffusion of iron into the molten zinc proceeds. Accordingly, in an intermediate cooling process between the end of heating and the start of pressing, iron concentration in the molten zinc increases to 15% to 30%, and alloying between zinc and iron proceeds when the steel sheet is cooled down below 782° C. Γ phase appears as a result of alloying.

In the hot stamping of a galvanized steel sheet, timing of pressing is important for the reason described below. If the galvanized steel sheet is pressed before or immediately after the start of alloying reaction, the steel will cause embrittlement cracking at the grain boundary due to an unalloyed portion of the molten zinc, only to produce defective products. Even if the embrittlement cracking fortunately does not occur at the grain boundary of steel, the molten zinc will adhere on the inner surfaces of the dies, so that the dies have to be cleaned up quite often. This also decreases the zinc content in the surficial portion of products, degrades the corrosion resistance of the product, and thereby causes problems in performance of the resultant components. In the hot stamping of the galvanized steel sheet, it is therefore desirable to press the steel sheet after the alloying reaction is completed in the intermediate cooling process.

It is not, however, easy to start the pressing timely by appropriately controlling the heating process and the intermediate cooling process, since the galvanized steel sheet is now broadly diversified and include those with various types of plating, plate weight, sheet thickness and size. In short, although the conventional process control has been empirically based on heating time, heating temperature, intermediate cooling time, and starting temperature of pressing, it is difficult to exactly determine the end point of the alloying reaction.

One possible method for detecting the end point of the alloying reaction is to observe the surface of the galvanized steel sheet by X-ray diffractometry, and to detect the end point based on the result. The method, however, needs a large scale apparatus and pushes up the cost of equipment. Another problem is that detection in such high temperature state is difficult. Still another problem is that visual observation may vary largely from person to person, particularly under such high temperature condition, and this may inhibit stable control.

Patent Document 1 discloses a method of heating the galvanized steel sheet up to 800° C. to 950° C. in a heating furnace, followed by rapid cooling down to 500° C. to 730° C. in a quenching equipment, and pressing. The method is, however, hardly applicable to ordinary hot stamping of galvanized steel sheet, since the method is specialized for the purpose of improving corrosion resistance and fatigue resistance, and in need of quenching equipment.

On the other hand, Patent Document 2 describes a method of observing the degree of proceeding of the alloying reaction in a Fe—Zn system based on spectral emissivity, in the process of manufacturing of an alloyed galvanized steel sheet. The temperature range in which the observation takes place according to the method described in Patent Document 2 is, however, extremely lower than the temperature range in which the hot stamping takes place. It is therefore impossible for the method described in Patent Document 2 to detect the state of surface of the galvanized steel sheet, in the intermediate cooling process of hot stamping.

CITATION LIST

Patent Literature

Patent Literature 1: Japanese Laid-Open Patent Publication No. 2007-182608
Patent Literature 2: Japanese Laid-Open Patent Publication No. H07-55737

SUMMARY OF INVENTION

Technical Problem

It is therefore an object of the present invention to provide a method of hot stamping a galvanized steel sheet capable of starting pressing and quenching after the molten zinc has completely disappeared.

Solution to Problem

The present inventors found that the start of the alloying reaction, and the end thereof, or disappearance of molten zinc is detectable based on change in emissivity of a surface of the galvanized steel sheet in a predetermined temperature range, which the change in emissivity is measured using an emissivity sensor with a predetermined observation wavelength in the process of cooling after the heating. The present inventors finally reached various modes of embodiment described below.

(1)
A method of hot stamping a galvanized steel sheet comprising:
heating a galvanized steel sheet up to a temperature lower than the boiling point of zinc, and not lower than the austenite transformation temperature of the galvanized steel sheet;
then, cooling the galvanized steel sheet; and
then, pressing and quenching the galvanized steel sheet, wherein
in the cooling the galvanized steel sheet, change in emissivity of a surface of the galvanized steel sheet is measured in a temperature range lower than the boiling point of zinc but not lower than the ferrite transformation temperature, using an emissivity sensor with an observation wavelength of 1.4 μm or longer, and the pressing and quenching is started upon completion of an alloying reaction detected based on the change in emissivity.

(2)

The method of hot stamping a galvanized steel sheet according to (1), wherein the emissivity of the surface of the galvanized steel sheet is continuously measured.

(3)

The method of hot stamping a galvanized steel sheet according to (1) or (2), wherein the emissivity sensor comprises an InGaAs element or a thermopile as a measuring element.

(4)

The method of hot stamping a galvanized steel sheet according to any one of (1) to (3), wherein the measuring the change in emissivity of the surface of the galvanized steel sheet comprises:

smoothing the emissivity measured using the emissivity sensor by moving averaging;

then, differentiating the result of the smoothing to obtain a rate of change in emissivity; and then, determining a start point of the alloying reaction by a point where the rate of change in emissivity turns from negative into positive, and determining an end point of the alloying reaction by a point where the rate of change in emissivity turns from positive into negative after the start point.

(5)

The method of hot stamping a galvanized steel sheet according to any one of (1) to (4), wherein the emissivity sensor has an observation wavelength of 8 μm to 40 μm.

(6)

A method of hot stamping a galvanized steel sheet, in advance, an off-line test apparatus simulating a hot stamping facility being used to acquire a time for alloying reaction, the off-line test apparatus being equipped with the emissivity sensor described in any one of (1) to (5), and being configured to perform the heating a galvanized steel sheet and the cooling the galvanized steel sheet in the method of hot stamping described in any one of (1) to (5), the time for alloying reaction being a time from start of the cooling up to completion of the alloying reaction, and is acquired based on the change in emissivity through the measurement with the emissivity sensor, and the time for alloying reaction being stored in a controller of a hot stamping facility, the method comprising, using the hot stamping facility:

starting pressing and quenching a galvanized steel sheet after the controller detects that an elapsed time reaches the time for alloying reaction.

(7)

A method of hot stamping a galvanized steel sheet, in advance, the heating a galvanized steel sheet and the cooling the galvanized steel sheet in the method of hot stamping described in any one of (1) to (5) being performed using an off-line test apparatus simulating a hot stamping facility, in the cooling the galvanized steel sheet, the measurement with the emissivity sensor being performed and a time for alloying reaction from start of the cooling up to completion of the alloying reaction being acquired based on the change in emissivity, and the time for alloying reaction being stored in a controller of a hot stamping facility, the method comprising, using the hot stamping facility:

heating a second galvanized steel sheet up to a temperature substantially equal to that in the heating the galvanized steel sheet, the second galvanized steel sheet having the same composition as the galvanized steel sheet;

then, cooling the second galvanized steel sheet at a rate substantially equal to that in the cooling the galvanized steel sheet; and then, pressing and quenching the second galvanized steel sheet, wherein in the cooling the second galvanized steel sheet, an elapsed time after the start of cooling is measured, and the pressing and quenching is started after the controller detects that the elapsed time reached the time for alloying reaction.

Advantageous Effects of Invention

According to the present invention, completion of the alloying reaction may exactly be understood, irrespective of species of plating, plate weight, sheet thickness and size of the galvanized steel sheet. Accordingly, pressing and quenching may be started after the molten zinc has completely disappeared.

DESCRIPTION OF EMBODIMENTS

Figure 1:
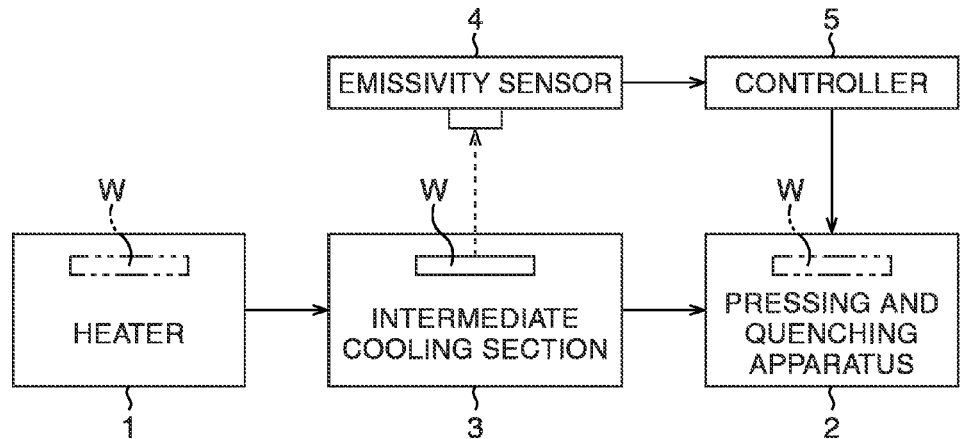
FIG. 1 is a block diagram illustrating a facility suitable for a method of hot stamping a galvanized steel sheet according to the embodiments (1) to (5) of the present invention.

Embodiments of the present invention will be detailed referring to the attached drawings. FIG. 1 is a block diagram illustrating a facility suitable for a method of hot stamping a galvanized steel sheet according to the embodiments of the present invention.

The hot stamping facility includes a heater 1 which heats a galvanized steel sheet W up to a predetermined temperature, an intermediate cooling section 3 which cools the galvanized steel sheet W taken out from the heater 1 by allowing it to stand or the like, and a pressing and quenching apparatus 2 which presses and quenches the galvanized steel sheet W cooled in the intermediate cooling section 3. The facility additionally includes an emissivity sensor 4 which measures emissivity of a surface of the galvanized steel sheet W which stays in the intermediate cooling section 3.

The galvanized steel sheet W may be either a hot-dip galvanized steel sheet or an electrogalvanized steel sheet. Coating weight may be 50 g/m$^2$ or larger for a hot-dip galvanized steel sheet, 60 g/m$^2$ or larger for an galvannealed steel sheet, 50 g/m$^2$ or larger for an electrogalvanized steel sheet, and 60 g/m$^2$ or larger for an electro-galvannealed steel sheet in order to achieve resistance equivalent to that of a galvannealed steel sheet for cold pressing with a coating weight of 45 g/m².

The heater 1, at the primary stage of the hot stamping facility, may adopt energizing heating, furnace heating, near-infrared heating, far-infrared heating, induction heating or the like. It is preferable to use an energizing heating apparatus in a case where automotive components are hot-stamped. This is because, the energizing heating device is compact in size, capable of improving productivity by virtue of rapidness in heating, readily controllable in heating temperature, and capable of heating the galvanized steel sheet in a uniform manner. The maximum heating temperature of the heater 1 falls on the Ac3 point or above, and below the boiling point of zinc, and practically in the range from 800° C. to 900° C. Heating rate of the galvanized steel sheet W is practically 10° C./sec or above and 200° C./sec or below, and preferably in the range from 20° C./sec to 200° C./sec from the viewpoint of improving the productivity.

Figure 2:
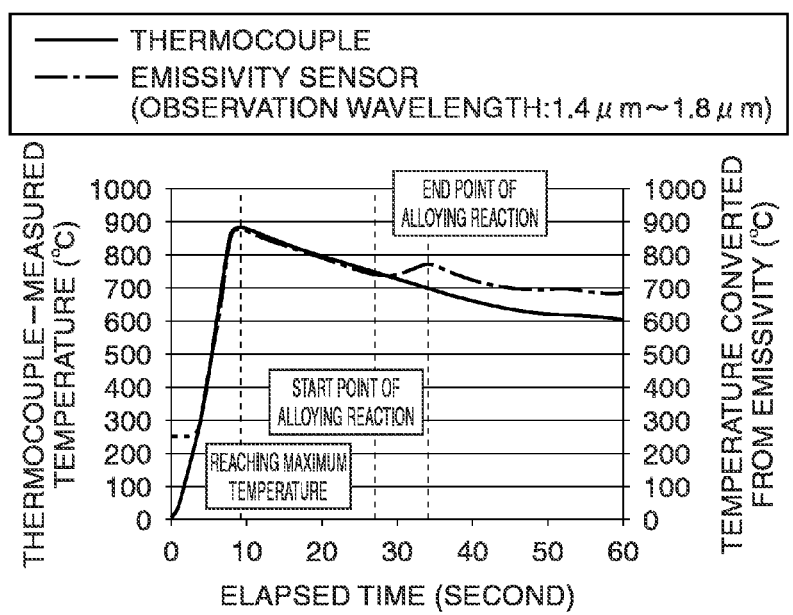
FIG. 2 is a graph illustrating changes in temperature measured using a thermocouple, and changes in temperature calculated by converting emissivity into temperature.

As described above, in this temperature range (Ac3 point or above, and below the boiling point of zinc), an alloying reaction between iron and zinc proceeds through liquid phase diffusion of iron into molten zinc. Now temperature change of the hot-dip galvanized steel sheet, in the process of heating using the heater 1, and succeeding cooling in the intermediate cooling section 3, will be explained. It is now defined that the temperature of the hot-dip galvanized steel sheet is measured using a thermocouple, and calculated by converting the emissivity observed using an emissivity sensor into temperature. In the following description, the temperature measured using a thermocouple will occasionally be referred to as "thermocouple-measured temperature", and temperature calculated by temperature conversion of emissivity measured using an emissivity sensor will occasionally be referred to as "temperature converted from emissivity". The temperature converted from emissivity reflects substantially value of emissivity and change thereof. FIG. 2 illustrates thermocouple-measured temperature and temperature converted from emissivity. The solid line in FIG. 2 indicates changes in thermocouple-measured temperature from the start of heating, and the one-dot chain line indicates changes in temperature converted from emissivity measured, from the start of heating, using an emissivity sensor with an observation wavelength of 1.4 μm to 1.8 μm. According to the illustrated example, the alloying reaction starts approximately 17 seconds after the temperature of galvanized steel sheet reached the maximum temperature (approximately 880° C., approximately 10 seconds after the start of heating), and ended approximately 25 seconds after the maximum temperature was reached. As seen in FIG. 2, the temperature converted from emissivity clearly shows changes in the start point and end point of alloying, and it is understood that difference in the observation wavelength of the emissivity sensor correlates with the start point and the end point of alloying. On the other hand, the thermocouple-measured temperature showed no influence of the alloying reaction, proving that it is impossible to determine completion of the alloying reaction from changes in the thermocouple-measured temperature.

From the viewpoint of improving the productivity, the heating rate by the heater 1 preferably falls in the range from 20° C./sec to 200° C./sec as described above, which is relatively rapid. The temperature range in which the end of alloying reaction is detected is below the boiling point of plated zinc, and not lower than the ferrite transformation temperature of the steel. The temperature range in which the end of alloying reaction is detected is set below the boiling point of plated zinc, because the heating above the boiling point will unfortunately allow zinc to vaporize off from the surface of the steel sheet, so that the steel sheet is no longer a galvanized steel sheet. On the other hand, the temperature range is set not lower than the ferrite transformation temperature of steel, in order to stably obtain a martensite structure by the quenching in the pressing and quenching apparatus 2. In order to stably obtain the martensite structure by quenching, the quenching is necessarily started at a temperature not lower than the ferrite transformation temperature. The martensite structure cannot be obtained by quenching in a stable manner, if the completion of alloying reaction is judged below the ferrite transformation temperature. In the example illustrated in FIG. 2, the steel sheet is heated up to approximately 880° C., which is below the boiling point of zinc, and the alloying reaction ends at approximately 700° C. in the succeeding intermediate cooling, wherein the ferrite transformation occurs at approximately 650° C.

The boiling point of zinc is 908° C. or around in a hot-dip galvanized steel sheet, a galvannealed steel sheet, an electro-galvanized steel sheet or an electro-galvannealed steel sheet, while it may slightly vary depending on the content of other metal elements contained in the plated layer. The ferrite transformation temperature is 650° C. or around when a carbon content is 0.18% by mass to 0.25% by mass, which is suited to hot stamping, while it may slightly vary depending on other chemical components in the steel sheet, and also depending on the heating rate, heating temperature and so on in the heater 1.

Temperature of galvanized steel sheet is measured generally by using a thermocouple or a radiation thermometer. Temperature measurement using the radiation thermometer occasionally gives measured values differing by approximately 20° C. from those obtained by using the thermocouple.

The present inventors then focused on the observation wavelength of the emissivity sensor, and change in the temperature converted from emissivity at the wavelength. In this embodiment, for example, the galvanized steel sheet W heated to 800° C. to 900° C. by the heater 1 is taken out into the intermediate cooling section 3, and the emissivity of the surface of the galvanized steel sheet W having been heated by the heater 1 is measured using the long-wavelength emissivity sensor 4 with an observation wavelength of 1.4 μm or longer, and more preferably using the emissivity sensor 4 with an observation wavelength of 8 μm to 40 μm. With progress of the alloying reaction, the surface state of the galvanized steel sheet W changes from liquid to solid, and also the property changes. In association with these changes, energy of infrared radiation changes. This embodiment is to determine the start point and the end point of the alloying reaction, and disappearance of the molten zinc, by continuously detecting the above-described change in the energy of infrared radiation which represents change in the emissivity or temperature converted from emissivity.

The emissivity sensor 4 used in this embodiment preferably includes an InGaAs element or a thermopile as a measuring element. The thermopile is particularly preferable since it can capture the change in emissivity in an amplified manner. The measuring element composed of the thermopile may have a practical upper limit of observation wavelength of 40 μm. The thermopile includes a plurality of thermocouples connected in series or in parallel, and is a sort of converter capable of converting heat energy into electric energy. By concentrating hot junctions of a number of small thermocouples, heat radiation may be measured in a precise manner.

Figure 3:
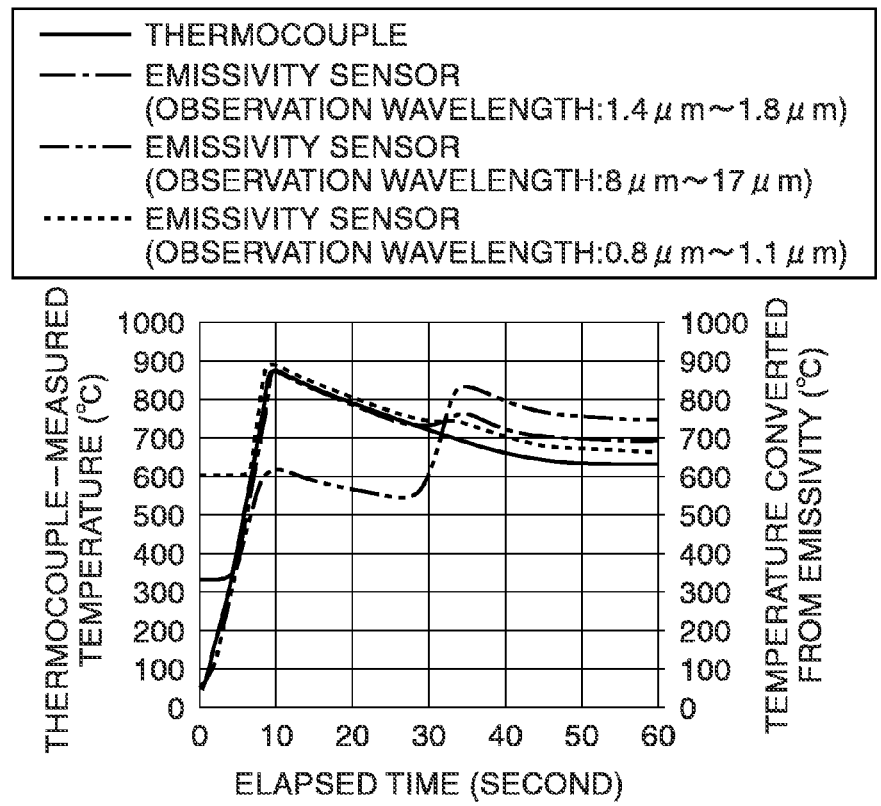
FIG. 3 is a graph illustrating changes in thermocouple-measured temperature, and temperature converted from emissivity measured using various emissivity sensors differing in observation wavelength.

As described above, in this embodiment, the long-wavelength emissivity sensor 4 with an observation wavelength of 1.4 μm or longer is used for detecting the start point and the end point of the alloying reaction. FIG. 3 illustrates thermocouple-measured temperature, and temperature converted from emissivity measured by using emissivity sensors with various observation wavelength values. In FIG. 3, the broken line indicates changes in the temperature converted from emissivity measured, from the start of heating, using an short-wavelength emissivity sensor with an observation wavelength of 0.8 μm to 1.1 μm, the one-dot chain line indicates changes in the temperature converted from emissivity measured, from the start of heating, using an emissivity sensor with an observation wavelength of 1.4 μm to 1.8 μm, and the two-dot chain line indicates changes in the temperature converted from emissivity measured, from the start of heating, using an emissivity sensor with an observation wavelength of 8 μm to 14 μm. As seen in FIG. 3, the short-wavelength emissivity sensor with an observation wavelength of 0.8 μm to 1.1 μm (broken line) gave only a small change, and failed in clearly detect the start point and the end point of the alloying reaction. In contrast, the emissivity sensor with an observation wavelength of 1.4 μm to 1.8 μm (one-dot chain line) gave large changes at the start point and the end point of the alloying reaction, and succeeded in clearly detecting them. The emissivity sensor with an observation wavelength of 8 μm to 14 μm (two-dot chain line) gave still larger changes at the start point and the end point of the alloying reaction, proving its ability of capturing the changes more clearly.

Figure 4:
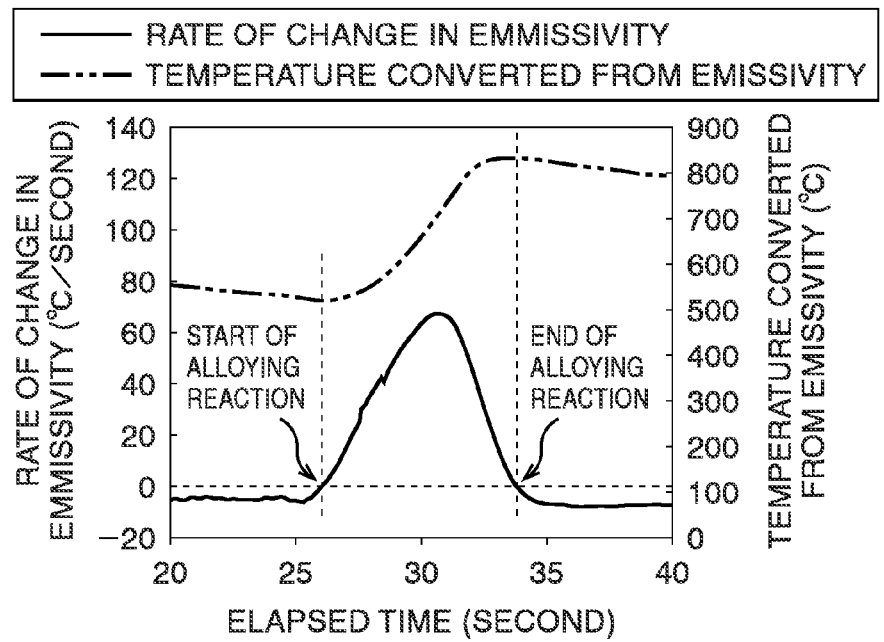
FIG. 4 is a graph obtained by replacing the ordinate of the graph in FIG. 3 with rate of change in emissivity, for the observation wavelength range of 8 μm to 14 μm.

FIG. 4 is a graph obtained by replacing the ordinate of the graph in FIG. 3 with rate of change in emissivity, for an observation wavelength range of 8 μm to 14 μm. As seen in FIG. 4, the rate of change in emissivity (solid line) is almost constant up to the start point of the alloying reaction, increases at the start point of the alloying reaction, then decreases, and again becomes constant beyond the end point of the alloying reaction. In short, also the rate of change in emissivity largely change at the start point and the end point of the alloying reaction. Accordingly, the end point of the alloying reaction may be determined more clearly, by judging the start point of the alloying reaction by a point where the rate of change in emissivity begins to increase from a constant value, and by judging the end point of the alloying reaction by a point where the rate turns into constant thereafter. The judgment may be still clearer, if the measured value of emissivity is smoothed by moving averaging and then the result of the smoothing is differentiated. In particular, the end point of the alloying reaction may be determined more clearly, by determining the start point by a point where the rate of change in emissivity turns from negative into positive, and by determining the end point of the alloying reaction by a point where the rate of change in emissivity turns from positive into negative after the start point, in the intermediate cooling process which proceeds in the intermediate cooling section 3.

The moving averaging herein is a technique of smoothing time-series data, and may be performed, for example, by simple moving averaging. In the simple moving averaging, a simple unweighted mean is obtained from the latest "n" data in new data. If another new data is acquired with elapse of time, a mean is calculated again while discarding the oldest data among the latest "n" data and adding the acquired new data. In the simple moving averaging, the above-described calculation is repeated thereafter. The graph shown in FIG. 4 also is obtained by the simple moving averaging, by sampling data in every 0.1 seconds from the emissivity sensor, using ten data per calculation. Note that the moving averaging adoptable herein may be of any other type, rather than the simple moving averaging.

In this embodiment, upon detection of the end point of the alloying reaction as described above, the galvanized steel sheet W is sent to the pressing and quenching apparatus 2, and pressing and quenching is started while the temperature is kept not lower than the ferrite transformation temperature of the steel. In other words, the pressing and quenching is started after the completion of alloying reaction has been determined, and thereby the molten zinc has completely disappeared.

As described in the above, according to this embodiment, the pressing and quenching may be started after completion of the alloying reaction, irrespective of species of plating, plate weight, sheet thickness and size of the galvanized steel sheet W. Embrittlement cracking at the grain boundary of steel, otherwise possibly induced by unalloyed molten zinc, is thus avoidable. Also adhesion of the molten zinc onto the inner surfaces of dies in the pressing and quenching apparatus 2, and degradation of corrosion resistance due to shortage of the amount of plated zinc are avoidable. In particular, more exact judgment may be obtained by determining the start point of the alloying reaction by a point where the rate of change in emissivity turns from negative into positive, and by determining the end point of the alloying reaction by a point where the rate of change in emissivity turns from positive into negative after the start poing.

Another possible configuration adoptable herein is such that, as illustrated in FIG. 1, the measured value of the emissivity sensor 4 is input to a controller 5, and that the controller 5 controls operations of the pressing and quenching apparatus 2.

Figure 5:
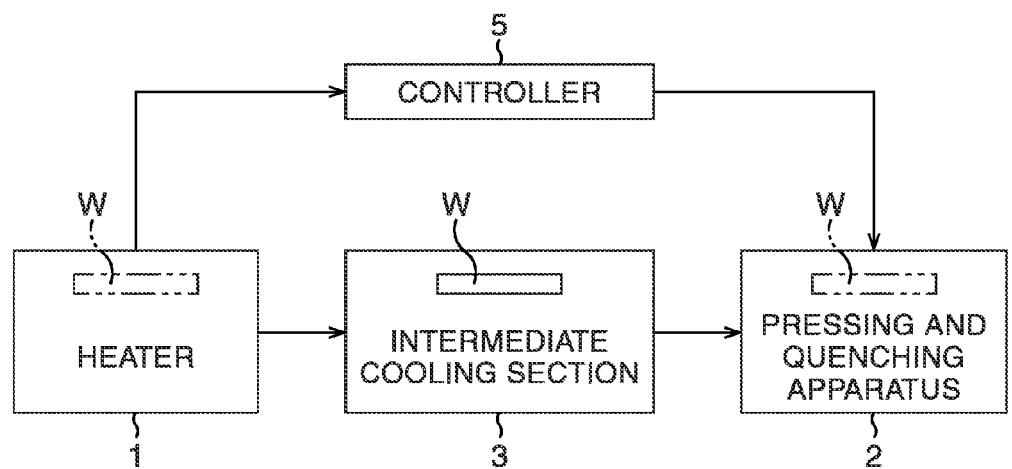
FIG. 5 is a block diagram illustrating a facility suitable for a method of hot stamping a galvanized steel sheet according to the embodiment (6).

For a case where it is difficult to install the emissivity sensor 4 in the facility of hot stamping due to limitations of facility, space or cost, the present invention may be configured so as to install the emissivity sensor 4 to an off-line test apparatus simulating the hot stamping facility, for example. In this case, a time for alloying reaction, which is a time from start of the cooling up to completion of the alloying reaction, may be obtained using the off-line test apparatus in advance similarly as described above; the time for alloying reaction may be stored in the controller 5 of an actual hot stamping facility as illustrated in FIG. 5; an elapsed time from the start of cooling may be measured during the cooling; and pressing and quenching may be started after the controller 5 detects that the elapsed time reached the time for alloying reaction. According to this method, hot stamping may be started after the molten zinc has completely disappeared, even though in situ measurement is not performed using the emissivity sensor 4. In this method, the heating temperature and the rate of cooling after the heating, adopted by the off-line test apparatus, may be set equal to those adopted by the actual hot stamping facility. Note that a desired level of effect may be obtained, by adjusting the heating temperature and the rate of cooling in the actual facility substantially equal to those used in the off-line test apparatus, without precisely equalizing them. For example, a desired level of effect may be obtained by adjusting the heating temperature in the actual facility so as to fall within the ±10° C. range around the heating temperature in the off-line test apparatus, and by adjusting the rate of cooling in the actual facility so as to fall within the ±2° C./sec range around the rate of cooling in the off-line test apparatus.

It should be noted that the above embodiments merely illustrate concrete examples of implementing the present invention, and the technical scope of the present invention is not to be construed in a restrictive manner by these embodiments. That is, the present invention may be implemented in various forms without departing from the technical spirit of main features thereof.

INDUSTRIAL APPLICABILITY

The present invention may be applicable to industries related to galvanized steel sheet used for vehicle body and so forth, for example.

The invention claimed is:

1. A method of hot stamping a galvanized steel sheet comprising:
   heating a galvanized steel sheet up to a temperature lower than the boiling point of zinc, and not lower than the austenite transformation temperature of the galvanized steel sheet;
   then, cooling the galvanized steel sheet; and
   then, pressing and quenching the galvanized steel sheet, wherein
   in the cooling the galvanized steel sheet, change in emissivity of a surface of the galvanized steel sheet is measured in a temperature range lower than the boiling point of zinc but not lower than the ferrite transformation temperature, using an emissivity sensor with an observation wavelength of 1.4 µm or longer,
   the pressing and quenching is started upon completion of an alloying reaction detected based on the change in emissivity, and
   the measuring the change in emissivity of the surface of the galvanized steel sheet comprises:
   smoothing the emissivity measured using the emissivity sensor by moving averaging;
   then, differentiating the result of the smoothing to obtain a rate of change in emissivity; and
   then, determining a start point of the alloying reaction by a point where the rate of change in emissivity turns from negative into positive, and determining an end point of the alloying reaction by a point where the rate of change in emissivity turns from positive into negative after the start point.

2. A method of hot stamping a galvanized steel sheet comprising:
   heating a galvanized steel sheet up to a temperature lower than the boiling point of zinc, and not lower than the austenite transformation temperature of the galvanized steel sheet;
   then, cooling the galvanized steel sheet; and
   then, pressing and quenching the galvanized steel sheet, wherein
   in the cooling the galvanized steel sheet, change in emissivity of a surface of the galvanized steel sheet is measured in a temperature range lower than the boiling point of zinc but not lower than the ferrite transformation temperature, using an emissivity sensor with an observation wavelength of 1.4 µm or longer,
   the pressing and quenching is started upon completion of an alloying reaction detected based on the change in emissivity,
   the emissivity of the surface of the galvanized steel sheet is continuously measured, and
   the measuring the change in emissivity of the surface of the galvanized steel sheet comprises:
   smoothing the emissivity measured using the emissivity sensor by moving averaging;
   then, differentiating the result of the smoothing to obtain a rate of change in emissivity; and
   then, determining a start point of the alloying reaction by a point where the rate of change in emissivity turns from negative into positive, and determining an end point of the alloying reaction by a point where the rate of change in emissivity turns from positive into negative after the start point.

3. A method of hot stamping a galvanized steel sheet comprising:
   heating a galvanized steel sheet up to a temperature lower than the boiling point of zinc, and not lower than the austenite transformation temperature of the galvanized steel sheet;
   then, cooling the galvanized steel sheet; and
   then, pressing and quenching the galvanized steel sheet, wherein
   in the cooling the galvanized steel sheet, change in emissivity of a surface of the galvanized steel sheet is measured in a temperature range lower than the boiling point of zinc but not lower than the ferrite transformation temperature, using an emissivity sensor with an observation wavelength of 1.4 µm or longer,
   the pressing and quenching is started upon completion of an alloying reaction detected based on the change in emissivity,
   the completion is detected based on a rate of the change in emissivity, and
   measuring the change in emissivity of the surface of the galvanized steel sheet comprises:
   determining an end point of the alloying reaction by a point where the rate turns from positive into negative after the rate turns from negative into positive.

4. A method of hot stamping a galvanized steel sheet, comprising:
   (i) simulating a hot stamping facility to acquire a time for alloying reaction with an off-line test apparatus,
   wherein the off-line test apparatus is equipped with an emissivity sensor with an observation wavelength of 1.4 µm or longer to measure a change in emissivity of a surface of a galvanized steel sheet in a temperature range lower than the boiling point of zinc but not lower than the ferrite transformation temperature, and is configured to a heat the galvanized steel sheet up to a temperature lower than the boiling point of zinc, and not lower than the austenite transformation temperature of the galvanized steel sheet and cool the galvanized steel sheet,
   wherein the time for alloying reaction being a time from start of the cooling up to completion of the alloying reaction, and is acquired based on the change in emissivity through the measurement with the emissivity sensor, and
   wherein the time for alloying reaction being stored in a controller of a hot stamping facility,
   (ii) starting pressing and quenching a galvanized steel sheet after the controller detects that an elapsed time reaches the time for alloying reaction,
   wherein the measuring the change in emissivity of the surface of the galvanized steel sheet comprises:
   smoothing the emissivity measured using the emissivity sensor by moving averaging;
   then, differentiating the result of the smoothing to obtain a rate of change in emissivity; and
   then, determining a start point of the alloying reaction by a point where the rate of change in emissivity turns from negative into positive, and determining an end point of the alloying reaction by a point where the rate of change in emissivity turns from positive into negative after the start point.

5. A method of hot stamping a galvanized steel sheet, comprising:

(i) heating a galvanized steel sheet up to a temperature lower than the boiling point of zinc, and not lower than the austenite transformation temperature of the galvanized steel sheet and then cooling the galvanized steel sheet using an off-line test apparatus simulating a hot stamping facility, wherein the off-line test apparatus is equipped with an emissivity sensor with an observation wavelength of 1.4 µm or longer to measure a change in emissivity of a surface of a galvanized steel sheet in a temperature range lower than the boiling point of zinc but not lower than the ferrite transformation temperature, wherein when cooling the galvanized steel sheet, the measurement with the emissivity sensor is performed and a time for alloying reaction from start of the cooling up to completion of the alloying reaction is acquired based on the change in emissivity, and wherein the time for alloying reaction being stored in a controller of a hot stamping facility, (ii) heating a second galvanized steel sheet up to a temperature substantially equal to that in the heating the galvanized steel sheet, the second galvanized steel sheet having the same composition as the galvanized steel sheet;

(iii) then, cooling the second galvanized steel sheet at a rate substantially equal to that in the cooling the galvanized steel sheet; and (iv) then, pressing and quenching the second galvanized steel sheet, wherein in the cooling the second galvanized steel sheet, an elapsed time after the start of cooling is measured, and the pressing and quenching is started after the controller detects that the elapsed time reached the time for alloying reaction, the emissivity of the surface of the galvanized steel sheet is continuously measured, and the measuring the change in emissivity of the surface of the galvanized steel sheet comprises:

smoothing the emissivity measured using the emissivity sensor by moving averaging;

then, differentiating the result of the smoothing to obtain a rate of change in emissivity; and then, determining a start point of the alloying reaction by a point where the rate of change in emissivity turns from negative into positive, and determining an end point of the alloying reaction by a point where the rate of change in emissivity turns from positive into negative after the start point.

* * * * *